(12) United States Patent
Hao et al.

(10) Patent No.: US 10,790,574 B2
(45) Date of Patent: Sep. 29, 2020

(54) HOUSING OF ELECTRONIC DEVICE AND ELECTRONIC DEVICE

(71) Applicant: Samsung Electronics Co., Ltd., Suwon-si, Gyeonggi-do (KR)

(72) Inventors: Rui Hao, Guangzhou (CN); Tianhua Feng, Guangzhou (CN); Dongmei Dan, Guangzhou (CN); Yuhao Fu, Guangzhou (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/116,185

(22) Filed: Aug. 29, 2018

(65) Prior Publication Data

US 2019/0067798 A1  Feb. 28, 2019

(30) Foreign Application Priority Data

Aug. 29, 2017 (CN) .......................... 2017 1 0755380

(51) Int. Cl.
*H04M 1/00* (2006.01)
*H01Q 1/24* (2006.01)
(Continued)

(52) U.S. Cl.
CPC ........... *H01Q 1/243* (2013.01); *H04B 5/0031* (2013.01); *H04B 5/0037* (2013.01); *G06K 19/07779* (2013.01); *H01Q 1/2225* (2013.01); *H01Q 1/2258* (2013.01); *H01Q 1/2291* (2013.01); *H01Q 1/36* (2013.01); *H01Q 7/06* (2013.01); *H04B 5/0081* (2013.01); *H04B 5/02* (2013.01)

(58) Field of Classification Search
None
See application file for complete search history.

(56) References Cited

U.S. PATENT DOCUMENTS 4,506,148 A * 3/1985 Berthold .......... G06K 19/07749
235/380
5,625,290 A * 4/1997 You ...................... H01L 39/225
324/248
(Continued)

FOREIGN PATENT DOCUMENTS

CN  102405556 A  4/2012
CN  102714430 A  10/2012
(Continued)

OTHER PUBLICATIONS

International Search Report with Written Opinion dated Dec. 3, 2018; International Appln. No. PCT/KR2018/010011.
(Continued)

*Primary Examiner* — Khalid W Shaheed
(74) *Attorney, Agent, or Firm* — Jefferson IP Law, LLP

(57) ABSTRACT

An electronic device and a housing for the electronic device are provided. The housing includes a metal part. The metal part includes at least one spiral slot formed on the metal part A portion of the metal part which is disposed between an innermost loop and an outermost loop of the spiral slot forms a spiral metal coil by being spaced by the spiral slot. The spiral metal coil is configured as an antenna radiation element electrically connected with an antenna circuit inside the electronic device, and the spiral slot is filled with an insulating material.

16 Claims, 6 Drawing Sheets

(51) Int. Cl.
  *H04B 5/00* (2006.01)
  *H01Q 1/22* (2006.01)
  *H04B 5/02* (2006.01)
  *H01Q 1/36* (2006.01)
  *H01Q 7/06* (2006.01)
  *G06K 19/077* (2006.01)

(56) References Cited

U.S. PATENT DOCUMENTS

| | | | |
|---|---|---|---|
| 2007/0152901 A1* | 7/2007 | Hockey | G06K 19/07749 343/793 |
| 2011/0115303 A1 | 5/2011 | Baarman et al. | |
| 2012/0091821 A1 | 4/2012 | Kato et al. | |
| 2015/0289394 A1* | 10/2015 | Kalhoff | H04B 5/0012 361/752 |
| 2016/0006293 A1* | 1/2016 | Jeong | H02J 7/025 320/108 |
| 2016/0073221 A1 | 3/2016 | Yang et al. | |
| 2016/0111889 A1 | 4/2016 | Jeong | |
| 2016/0134019 A1 | 5/2016 | Lee et al. | |
| 2016/0204836 A1 | 7/2016 | Lee et al. | |
| 2016/0268672 A1* | 9/2016 | Liu | H01Q 1/2208 |
| 2016/0292669 A1* | 10/2016 | Tunnell | G06Q 20/3278 |
| 2017/0077597 A1* | 3/2017 | Gong | H04M 1/026 |
| 2017/0098958 A1 | 4/2017 | Yio et al. | |
| 2018/0241857 A1 | 8/2018 | Wang et al. | |
| 2018/0301787 A1* | 10/2018 | Han | H01Q 13/10 |
| 2019/0115647 A1 | 4/2019 | Zhao et al. | |

FOREIGN PATENT DOCUMENTS

| | | | |
|---|---|---|---|
| CN | 105006654 A | 10/2015 | |
| CN | 204905438 A | 12/2015 | |
| CN | 105261822 A | 1/2016 | |
| CN | 105261834 A | 1/2016 | |
| CN | 105655706 A | 6/2016 | |
| CN | 106033832 A | 10/2016 | |
| CN | 106329060 A | 1/2017 | |
| CN | 106329114 A | 1/2017 | |
| CN | 106662896 A | 5/2017 | |
| KR | 10-2015-0025968 A | 3/2015 | |
| KR | 10-2016-0043752 A | 4/2016 | |
| WO | 2017/000768 A1 | 1/2017 | |
| WO | 2017/004916 A1 | 1/2017 | |
| WO | WO-2017122480 A1 * | 7/2017 | H01Q 1/24 |

OTHER PUBLICATIONS

Chinese Office Action with English translation dated Nov. 18, 2019; Chinese Appln. No. 201710755380.3.
European Search Report dated Apr. 22, 2020; European Appln. No. 18852189.2-1220/3649698 PCT/KR2018010011.
European Search Report dated Jul. 27, 2020; European Appln. No. 18852189.2-1220/3649698 PCT/KR2018010011.

* cited by examiner

HOUSING OF ELECTRONIC DEVICE AND ELECTRONIC DEVICE

CROSS-REFERENCE TO RELATED APPLICATION(S)

This application is based on and claims priority under 35 U.S.C. § 119 of a Chinese patent application number 201710755380.3, filed on Aug. 29, 2017, in the State Intellectual Property Office of the People's Republic of China, the disclosure of which is incorporated by reference herein in its entirety.

BACKGROUND

1. Field

The disclosure relates to the technical field of electronic devices. More particularly, the disclosure relates to an electronic device and a housing of the electronic device.

2. Description of Related Art

Recently, with the development of wireless terminal and communication technology, near field communication (NFC) has been researched and applied widely. In the related technology, as for a near field antenna (for example, an NFC antenna) of an electronic device having a metal back cover, in general, the following sequence occurs. Firstly, a signal is transmitted through a coil antenna inside the electronic device. Secondly, signal energy is coupled to the metal back cover. Thirdly, a magnetic field is excited by the metal back cover to radiate outward. However, this radiation reduces the radiation performance of the coil antenna.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a housing of an electronic device and an electronic device, so as to solve the problem of the radiation performance of the antenna coil of the electronic device being low (or being weak).

Another aspect of the disclosure is to provide an advantage in appearance of an electronic device by making width of a slot included in a metal part of a housing of the electronic device smaller than a determined value using a micro-slot processing technology.

Additional aspects will be set forth in part in the description which follows and, in part, will be apparent from the description, or may be learned by practice of the presented embodiments.

In accordance with an aspect of the disclosure, a housing of an electronic device is provided. The housing includes a metal part, at least one spiral slot formed on the metal part, wherein a portion of the metal part which is disposed between an innermost loop and an outermost loop of the spiral slot forms a spiral metal coil by being spaced by the spiral slot, wherein the spiral metal coil configured as an antenna radiation element is electrically connected with an antenna circuit inside the electronic device, and wherein the spiral slot is filled with an insulating material.

Further, at least one first slot filled with the insulating material is formed on a portion of the metal part which is enclosed by the innermost loop of the spiral slot, or at least one second slot filled with the insulating material from the outermost loop of the spiral slot to an edge of the housing is formed on a portion of the metal part which is disposed outside the outermost loop of the spiral slot.

Further, each first slot splits the portion of the metal part which is enclosed by the innermost loop of the spiral slot into two parts.

Further, the at least one spiral slot is formed by cutting the metal part by a micro-slot processing technology.

Further, the at least one first slot and/or the at least one second slot is formed by cutting the metal part by a micro-slot processing technology.

Further, a width of a micro-slot formed by the micro-slot processing technology is less than 0.2 mm.

Further, the spiral metal coil is one of: a spiral metal coil for near field communication (NFC), a spiral metal coil for wireless power charging (WPC) and a spiral metal coil for magnetic secure transmission (MST).

Further, the housing further includes, at least one switch, wherein each switch is used to connect two of the spiral metal coils in series.

Further, the housing includes a first metal coil for NFC, a second metal coil including a predetermined coil length, and one switch disposed between the first spiral metal coil and the second spiral metal coil, wherein a sum of the predetermined coil length and a coil length of the first spiral metal coil for NFC is appropriate for a coil length for WPC.

In accordance with another aspect of the disclosure, an electronic device is provided. The electronic device includes the housing as mentioned above.

Further, the electronic device includes one conductive coil being connected with the at least one spiral metal coil in series within the electronic device.

Further, at least part of a projection of the one conductive coil overlaps with a projection of the at least one spiral metal coil.

In accordance with another aspect of the present disclosure, an electronic device is provided. The electronic device includes a housing which comprises a metal part, and at least one conductive coil, wherein a first slot is formed in a projection area of a space enclosed by the innermost loop of the conductive coil on the metal part, wherein a second slot is formed outside a projection area of a space enclosed by an outermost loop of the conductive coil on the metal part, and wherein the first and second slots are filled with an insulating material.

Further, the conductive coil is arranged inside the electronic device, the first slot is an annular slot, the second slot is an annular slot, and the first slot is connected to the second slot through at least one third slot, and wherein the third slot is filled with the insulating material.

Further, the first slot, the second slot and the third slot are formed by cutting the metal part by a micro-slot processing technology.

Further, a width of a micro-slot formed by the micro-slot processing technology is less than 0.2 mm.

Further, the at least one conductive coil comprises at least one of a conductive coil for near field communication (NFC), a conductive coil for wireless power charging (WPC) and a conductive coil for magnetic secure transmission (MST).

In the housing of the electronic device and the electronic device according to the various embodiments of the disclosure, the radiation performance can be improved by forming a spiral slot on the housing to form a metal coil. So, signal radiating outward in a case of the disclosure can be implemented directly without undergoing the coupling of the housing when the metal coil works (e.g., is operational or activated), relative to the prior implementation of radiating outward after being excited by the antenna coil inside the electronic device and then coupled to the housing. On the other hand, an effect of a reverse vortex current generated by the housing on the radiation performance of the antenna coil can be reduced by forming a slot on the housing of the electronic device.

According to an embodiment of the disclosure, radiation performance of an antenna coil of an electronic device may be increased by the arrangement of a housing of the electronic device and the electronic device.

According to an embodiment of the disclosure, an advantage in appearance of an electronic device may be provided by making a width of a slot included in a metal part of a housing of the electronic device to be smaller than a determined (or predetermined) value using micro-slot processing technology.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to accompanying drawings provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, description of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Prior to a detailed description of the disclosure, an example of interpretable meaning of terminologies to be used in this specification will be provided. However, it will be noted that the terminologies are not limited to interpretation examples to be provided below.

Figure 1:
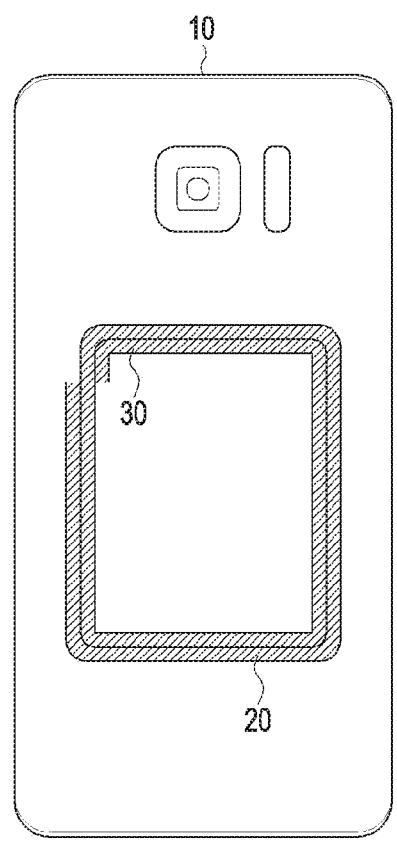
FIG. 1 illustrates a diagram of a housing of an electronic device according to an embodiment of the disclosure.

FIG. 1 illustrates a diagram of a housing of an electronic device according to an embodiment of the disclosure. The electronic device illustrated in FIG. 1, may, as an example, be a mobile communication terminal (such as a smart mobile phone), a smart wearable device (such as a smart watch), a tablet computer or other electronic devices.

Referring to FIG. 1, the housing of the electronic device according to an embodiment of the disclosure includes a metal part 10, at least one spiral slot 20 that is formed on the metal part 10 (as an example, FIG. 1 only shows an embodiment forming one spiral slot 20), a portion of the metal part 10 which is disposed between the innermost loop and outermost loop of the spiral slot 20 forms a spiral metal coil 30 by being spaced by the spiral slot 20, and the metal coil 30 as an antenna radiation element is electrically connected to an antenna circuit inside the electronic device, and the spiral slot 20 is filled with an insulating material.

Here, one spiral metal coil 30 may be formed corresponding to one spiral slot 20. In other words, a portion (e.g., the portion shown by a slant in FIG. 1) of the metal part 10 which is disposed between two adjacent loops of one spiral slot 20 can serve as a metal coil 30.

According to the embodiment of the disclosure, it is possible to form the metal coil as the antenna radiation element on the housing of the electronic device, and when the metal coil works (e.g., is operational or activated), it can be excited on the housing directly without undergoing the coupling of the housing (e.g., without being coupled to the housing), relative to the prior implementation of radiating outward after being excited by the antenna coil inside the electronic device and then being coupled to the housing, thereby improving the radiation performance.

As an example, a shape of the spiral slot 20 may be an annular spiral, and the shape of the spiral slot 20 can also be a square spiral. It should be understood that the shape of the spiral slot 20 can also be spiral or other shapes, and it is even possible that the spiral may be of an irregular shape. Thus, the shape of the slot is not limited to what is disclosed in the disclosure.

Further, a space between the two adjacent loops of the spiral slot 20 (that is, a width of the metal coil 30 formed by the spiral slot 20) may be 0.6 mm as an example. The space between the two adjacent loops of the spiral slot 20 is set according actual circumstance, so the space between the two adjacent loops of the spiral slot 20 may have a different value.

Further, for example, the spiral slot 20 may be formed by cutting the metal part 10 by a micro-slot processing technology (e. g., laser technology), that is, the spiral slot 20 may be a form of micro-slot. As an example, a width of the micro-slot formed by the micro-slot processing technology may be less than 0.2 mm. The width of the micro-slot may be varied according to setting.

Further, for example, the housing of the electronic device according to an embodiment of the disclosure may include at least one of a metal coil 30 for near field communication (NFC), a metal coil 30 for wireless power charging (WPC) and/or a metal coil 30 for magnetic secure transmission (MST). For example, one metal coil 30 formed on the housing can be used for NFC, and another metal coil 30 can be formed to be used for Magnetic Secure Transmission. It should be understood that, the metal coil 30 formed on the housing of the electronic device can also be used as an antenna radiation element for other types of communication.

Figure 2:
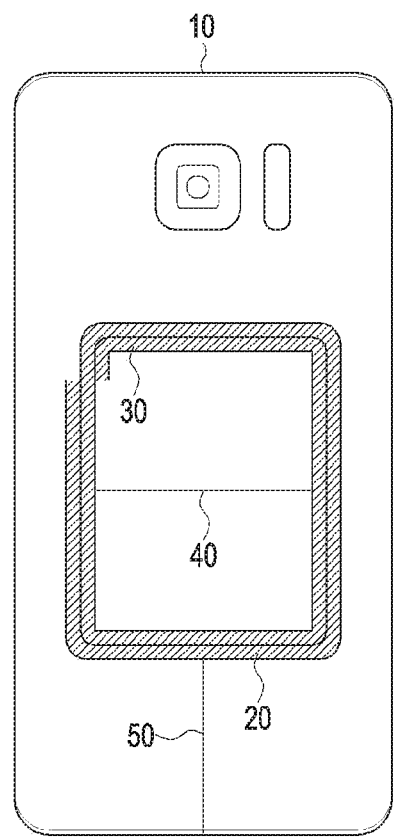
FIG. 2 illustrates a diagram of a housing of an electronic device according to an embodiment of the disclosure.

FIG. 2 illustrates a diagram of a housing of an electronic device according to an embodiment of the disclosure.

Referring to FIG. 2, at least one first slot 40 is filled with the insulating material is formed on a portion of the metal part 10 which is enclosed by the innermost loop of the spiral slot 20 (as an example, FIG. 2 only shows a case of forming one first slot 40), and at least one second slot 50 filled with the insulating material from the outermost loop of the spiral slot 20 to an edge of the housing is formed on a portion of the metal part 10 which is disposed outside the outermost loop of the spiral slot 20 (as an example, FIG. 2 only shows a case of forming one second slot 50). For reference, the metal part 10 may include one of the first slot 40 and the second slot 50, and may include all of the first slot 40 and the second slot 50. The metal part 10 may include another slot, not the first slot 40 and the second slot 50.

According to an embodiment of the disclosure, a reverse vortex current generated by the portion of the metal part 10 which is enclosed by the innermost loop of the spiral slot 20 and/or the portion of the metal part 10 which is disposed outside the outermost loop of the spiral slot 20 when the metal coil 30 works (e.g., operates or is operations) can be destroyed by forming at least one first slot 40 and/or at least one second slot 50 on the housing, such that the effect of the reverse vortex current on the radiation performance of the metal coil 30 can be reduced, thereby further improving the radiation performance of the metal coil 30 as the antenna radiation element.

For reference, each first slot 40 may split the portion of the metal part 10 which is enclosed by the innermost loop of the spiral slot 20 into two parts.

Further, the second slot 50 can be formed by using a universal serial bus (USB) jack and/or a headphone jack of the electronic device. For example, the second slot 50 from the outermost loop of the spiral slot 20 to an edge of the USB jack or an edge of the headphone jack of the electronic device may be formed.

For reference, the first slot 40 and/or the second slot 50 may be formed by cutting the metal part 10 by the micro-slot processing technology. As an example, a width of the micro-slot formed by the micro-slot processing technology may be less than 0.2 mm.

Figure 3:
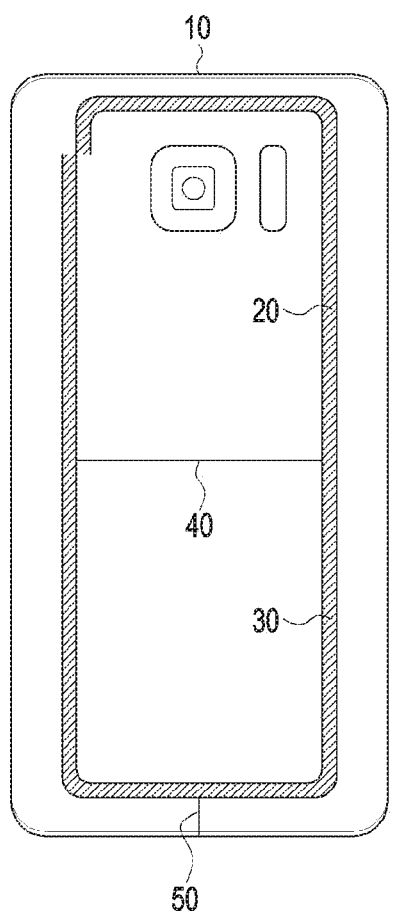
FIG. 3 illustrates perspective view of a part of a housing of an electronic device according to an embodiment of the disclosure.
Figure 4:
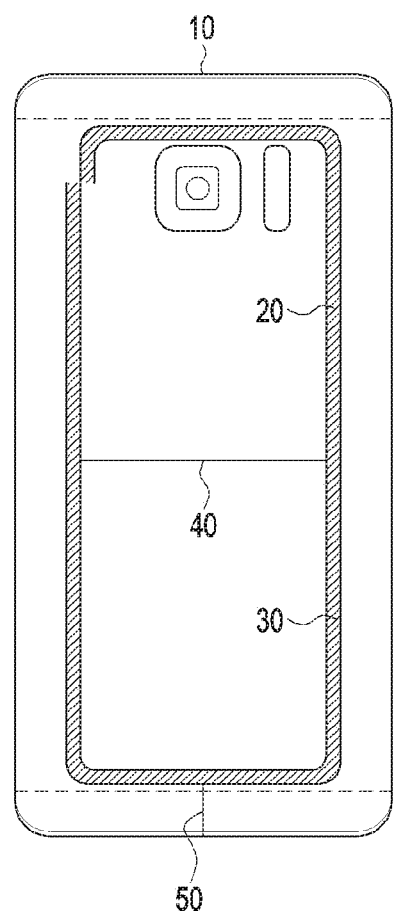
FIG. 4 illustrates a diagram of a housing of an electronic device according to an embodiment of the disclosure.

FIGS. 3-4 illustrate diagrams of a housing of an electronic device according to various embodiments of the disclosure.

Further, for example, the spiral slot 20 can be formed at a proper position of the housing of the electronic device to form the corresponding metal coil 30. As an example, as shown in FIG. 1, the spiral slot 20 can be formed at approximately the center of the housing. Further, for another example, as shown in FIG. 3, the spiral slot 20 can be formed at the position near the edge of the housing. For still another example, as shown in FIG. 4, the spiral slot 20 can be formed by avoiding a top region and a bottom region (the regions delineated by dotted lines shown in FIG. 4) that may be reserved for other antenna(s) (such as main antenna and mobile receive diversity (MRD) antenna).

Figure 5:
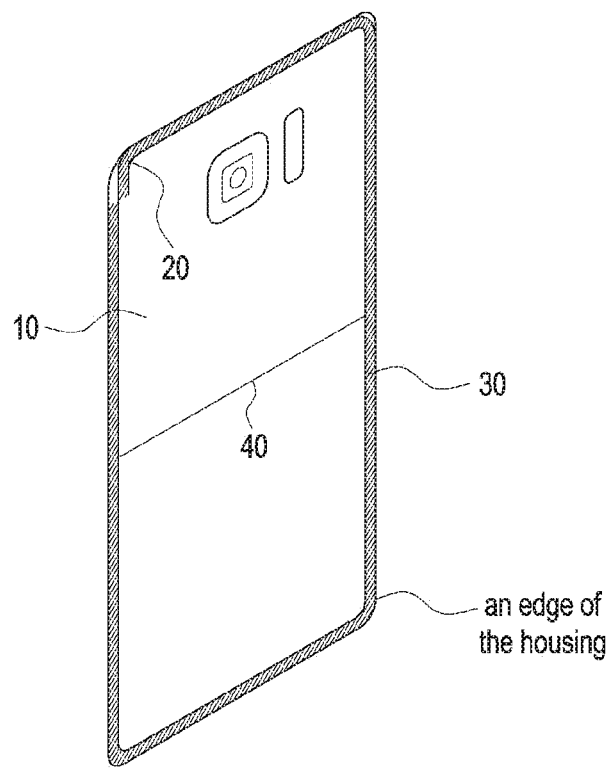
FIG. 5 illustrates a diagram of a housing of an electronic device according to an embodiment of the disclosure.

FIG. 5 illustrates perspective view of a housing of an electronic device according to an embodiment of the disclosure.

Referring to FIG. 5, the spiral slot 20 can be formed at a side frame of the housing, and since the corresponding metal coil 30 formed by the spiral slot 20 (here, the metal coil 30 can be constituted by all of the portion of the metal part 10 which is disposed between the two adjacent loops of the spiral slot 20 and the portion of the metal part 10 which is disposed between the outermost loop of the spiral slot 20 and the edge of the housing together. For example, the portion shown by a slant in FIG. 5) is disposed at the side frame, the exterior of the metal coil 30 is not enclosed by the metal part 10, thus no reverse vortex current will be generated. Thus, the first slot 40 can be formed only at the portion of the metal part 10 which is enclosed by the innermost loop of the spiral slot 20, so as to further improve the radiation performance of the metal coil 30.

Figure 6:
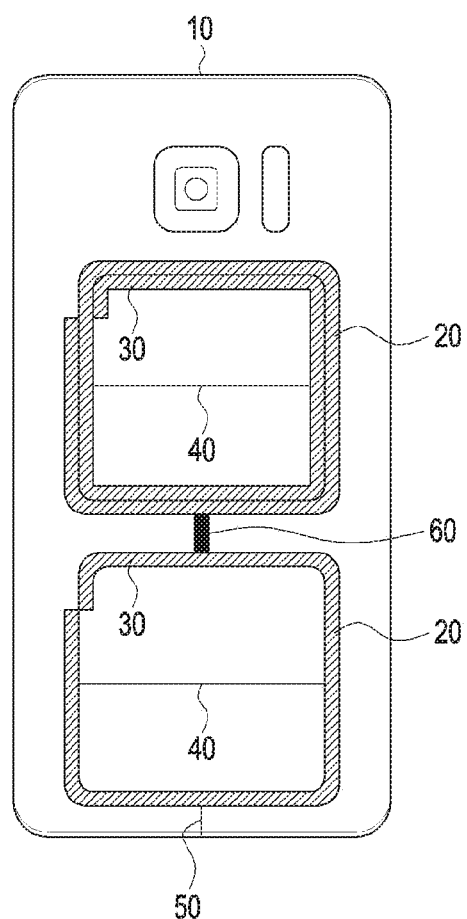
FIG. 6 illustrate a diagram of a housing of an electronic device according to an embodiment of the disclosure.

FIG. 6 illustrate a diagram of a housing of an electronic device according to an embodiment of the disclosure.

Referring to FIG. 6, furthermore, the housing of the electronic device according to another embodiment of the disclosure may further include at least one switch 60 (e.g., FIG. 6 shows a case of including only one switch 60), wherein the switch 60 is used to connect two metal coils 30 in series. Accordingly, when the switch 60 is turned off, the two metal coils 30 can serve as single (separate) coils, respectively, but when the switch 60 is turned on, the two metal coils 30 can be connected in series to serve as a single (combined) coil.

Finally, according to an embodiment of the disclosure, it is possible to meet the coil length requirements of different communication types, which simplifies the antenna design, and may also reduce the space occupied by the antenna.

With reference to FIG. 6, a housing of an electronic device according to an embodiment of the disclosure may include a first metal coil 30-1 for near field communication (NFC), a second metal coil 30-2 having a predetermined coil length, and at least one switch 60 disposed therebetween, wherein a sum of the predetermined coil length and a coil length of the first metal coil 30-1 for NFC satisfies a coil length for wireless power charging (WPC).

Further, as an example, an electronic device according to an embodiment of the disclosure may include a controller (e.g., at least one processor) (not shown). When it is detected (e.g., by the controller) that wireless power charging (WPC) is needed, the controller turns on the switch 60 so that the first metal coil 30-1 for near field communication (NFC) and the second metal coil 30-2 having a predetermined coil length serve as single metal coil for wireless power charging by connecting the first metal coil 30-1 to the second metal coil 30-2 in series, and when it is detected that wireless power charging is not needed, the controller turns off the switch 60 so that the first metal coil 30-1 for near field communication (NFC) can work alone (i.e., separately). Accordingly, the metal coil for wireless power charging (WPC) and the metal coil for near field communication (NFC) can share a part or parts of the coil.

Further, for example, the housing of the electronic device according to an embodiment of the disclosure may further include at least one first connection terminal (not shown) and at least one second connection terminal (not shown).

Specially, a first end of each of the metal coils 30-1 and 30-2 connects to a first connection terminal, respectively, and a second end of each of metal coils 30-1 and 30-2 connects to one second connection terminal, respectively. For example, the first end of one of the metal coils 30-1 and 30-2 can connect to the antenna circuit inside the electronic device through a first connection terminal, and the second end of the metal coil can connect to the antenna circuit inside the electronic device or an end of one switch 60 through a second connection terminal.

Further, the electronic device according to an embodiment of the disclosure may further include at least one conductive coil (not shown) arranged inside the electronic device, and a conductive coil may be connected with a metal coil (e.g., 30-1 or 30-2) in series. Thus, the number of loops of a spiral slot can be reduced. In addition, the radiation performance of the coil formed after the series connection can be preserved. As an example, a projection of the conductive coil can at least partially overlap with a projection of the metal coil (e.g., 30-1 or 30-2) which is connected with the conductive coil in series. In other words, the conductive coil can be arranged inside the electronic device near the metal coil.

Figure 7:
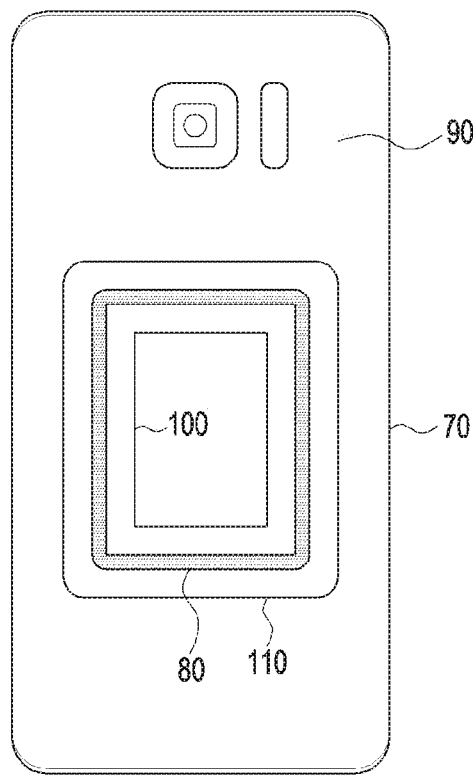
FIG. 7 illustrates a diagram of an electronic device according to an embodiment of the disclosure.

FIG. 7 illustrates a diagram of an electronic device according to an embodiment of the disclosure.

Referring to FIG. 7, the electronic device according to an embodiment of the disclosure includes a housing 70 and at least one conductive coil 80. The housing 70 includes a metal part 90, and a first slot 100 is formed in a projection area of a space enclosed by the innermost loop of the conductive coil 80 on the metal part 90, and a second slot 110 is formed in the outside of a projection area of a space enclosed by the outermost loop of the conductive coil 80 on the metal part 90. The first slot 100 and the second slot 110 are filled with insulating material.

As an example, one of the first slot 100 and the second slot 110 may be formed on the metal part 90, or both of the first slot 100 and the second slot 110 may be formed on the metal part 90.

Figure 8:
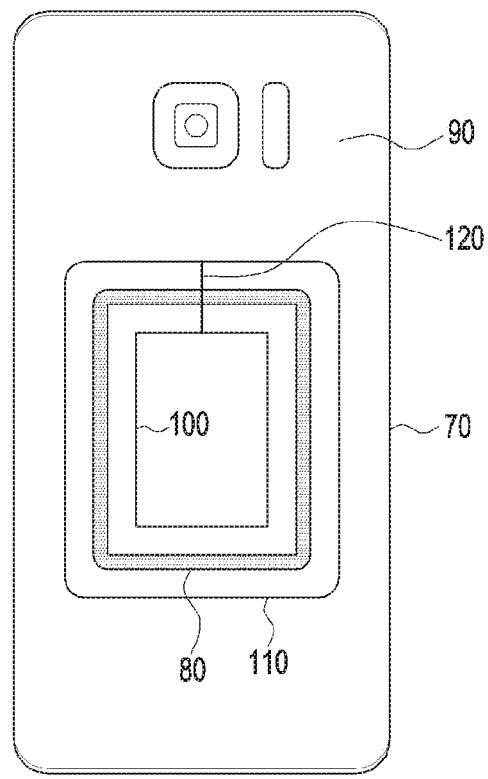
FIG. 8 illustrates a diagram of an electronic device according to an embodiment of the disclosure.

FIG. 8 illustrates a diagram of an electronic device according to an embodiment of the disclosure.

Referring to FIG. 8, the conductive coil 80 can be arranged inside the electronic device, the first slot 100 may be an annular slot, and the second slot 110 may also be an annular slot. The first slot 100 and the second slot 110 may be connected through at least a third slot 120 (as an example, FIG. 8 shows formation of a third slot 120). The third slot 120 is filled with an insulating material. In other words, the third slot 120 may also be formed on the metal part 90 and it enables the connection between the first slot 100 and the second slot 110. As an example, the conductive coil 80 can be located inside the electronic device below an area between the first slot 100 and the second slot 110.

According to an embodiment of the disclosure, a reverse vortex current generated by the housing under the influence of magnetic field generated by the conductive coil 80 can be destroyed (or eliminated) by forming the first slot 100, the second slot 110 and the third slot 120 on the housing, such that the effect of the reverse vortex current on the radiation performance of the metal coil 80 can be reduced, and the radiation performance of the conductive coil 80 may be improved.

As an example, the shape of the first slot 100 may be the same or different from that of the second slot 110, and the shapes of the first slot 100 and/or the second slot 110 may be the same or different from that of the corresponding conductive coil 80. For example, the shape of the first slot 100 and/or the shape of the second slot 110 may be circular, square, or appropriate annular shape, but the shape thereof is not limited to the disclosure.

As an example, the first slot 100, the second slot 110 and the third 120 may be formed by cutting the metal part 90 by the micro-slot processing technology. As an example, a width of the micro-slot formed by the micro-slot processing technology may be less than 0.2 mm.

As an example, at least one conductive coil 80 may include at least one of a conductive coil for near field communication (NFC), a conductive coil for wireless power charging (WPC) and/or a conductive coil for magnetic secure transmission (MST). It should be understood that, the metal coil 80 can also be used as an antenna radiation element for other types of communication.

According to the housing of the electronic device and the electronic device in various embodiments of the disclosure, the radiation performance can be improved by forming a spiral slot on the housing to form a metal coil so that signal radiating outward can be implemented directly without undergoing the coupling of the housing when the metal coil is operational, relative to the prior implementation of radiating outward after being excited by the antenna coil inside the electronic device and then coupled to the housing. On the other hand, an effect of a reverse vortex current generated by the housing on the radiation performance of the antenna coil can be reduced by forming a slot on the housing of the electronic device.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A housing of an electronic device, the housing comprising:
    a metal part;
    a spiral slot on the metal part formed by cutting the metal part, the spiral slot having a width less than a predetermined value;
    a first spiral metal coil for near field communication (NFC);
    a second spiral metal coil including a predetermined coil length; and
    at least one switch disposed between the first spiral metal coil and the second spiral metal coil,
    wherein a portion of the metal part which is disposed between an innermost loop and an outermost loop of the spiral slot forms a spiral metal coil by being spaced by the spiral slot,
    wherein the spiral metal coil configured as an antenna radiation element is electrically connected with an antenna circuit inside the electronic device,
    wherein the spiral slot is filled with an insulating material,
    wherein a space between adjacent loops of the spiral slot varies, and
    wherein a sum of the predetermined coil length and a coil length of the first spiral metal coil for the NFC is appropriate for a coil length for wireless power charging (WPC).

2. The housing of claim 1,
wherein at least one first slot filled with the insulating material is formed on a portion of the metal part which is enclosed by the innermost loop of the spiral slot, or
wherein at least one second slot filled with the insulating material from the outermost loop of the spiral slot to an edge of the housing is formed on a portion of the metal part which is disposed outside the outermost loop of the spiral slot.

3. The housing of claim 2, wherein the at least one first slot splits the portion of the metal part which is enclosed by the innermost loop of the spiral slot into two parts.

4. The housing of claim 2, wherein the at least one first slot or the at least one second slot is formed by cutting the metal part by a micro-slot processing technology.

5. The housing of claim 4, wherein a width of a micro-slot formed by the micro-slot processing technology is less than 0.2 mm.

6. The housing of claim 1, wherein the spiral metal coil is one of a spiral metal coil for near field communication (NFC), a spiral metal coil for wireless power charging (WPC), or a spiral metal coil for magnetic secure transmission (MST).

7. The housing of claim 1, further comprising:
at least one switch,
wherein the at least one switch is used to connect two of the spiral metal coils in series.

8. An electronic device, comprising the housing of claim 1.

9. The electronic device of claim 8, further comprising:
at least one conductive coil connected with a spiral metal coil in series and arranged inside the electronic device.

10. The electronic device of claim 9, wherein at least a part of a projection of the one conductive coil overlaps with a projection of the spiral metal coil.

11. An electronic device, comprising:
a housing including a metal part; and
at least one conductive coil arranged inside the electronic device,
wherein a first slot is formed in a projection area of a space enclosed by an innermost loop of the conductive coil on the metal part, and comprises an annular slot,
wherein a second slot is formed outside a projection area of a space enclosed by an outermost loop of the conductive coil on the metal part, and comprises an annular slot,
wherein the first slot is connected to the second slot through at least one third slot, and the first slot, the second slot, and the at least one third slot are filled with an insulating material, and
wherein the first slot and the second slot are formed with a width less than a predetermined value by cutting the metal part.

12. The electronic device of claim 11, wherein the third slot is formed by cutting the metal part by a micro-slot processing technology.

13. The electronic device of claim 12, wherein a width of a micro-slot formed by the micro-slot processing technology is less than 0.2 mm.

14. The electronic device of claim 11, wherein the at least one conductive coil comprises at least one of a conductive coil for near field communication (NFC), a conductive coil for wireless power charging (WPC) or a conductive coil for magnetic secure transmission (MST).

15. The electronic device of claim 11, wherein a shape of the first slot and a shape of the second slot are circular, square or annular shape.

16. The housing of claim 1, wherein the spiral metal coil is formed at a side frame of the housing.

* * * * *